US008416660B2

(12) United States Patent
Kurebayashi et al.

(10) Patent No.: US 8,416,660 B2
(45) Date of Patent: Apr. 9, 2013

(54) RECORDING QUALITY EVALUATION METHOD OF OPTICAL DISK AND OPTICAL DISK STORAGE SYSTEM

(75) Inventors: Masaaki Kurebayashi, Ebina (JP); Shinji Fujita, Yokohama (JP); Osamu Kawamae, Kawasaki (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/977,975

(22) Filed: Dec. 23, 2010

(65) Prior Publication Data

US 2011/0235487 A1    Sep. 29, 2011

(30) Foreign Application Priority Data

Mar. 26, 2010  (JP) .................................. 2010-072674

(51) Int. Cl.
    *G11B 7/00*    (2006.01)
(52) U.S. Cl. .................................. 369/47.53
(58) Field of Classification Search ............... 369/53.22
    See application file for complete search history.

(56) References Cited

U.S. PATENT DOCUMENTS 6,885,617 B2 *   4/2005   Fukumoto .................. 369/47.53
2008/0298194 A1 * 12/2008  Wada et al. ................. 369/53.34

FOREIGN PATENT DOCUMENTS

| JP | 2000-163881 | 6/2000 |
| JP | 2004-185477 | 7/2004 |
| JP | 2009-181621 | 8/2009 |

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

There is provided a method of calculating the degradation over time of the quality of data recorded on an optical disk in a short time. In the method, when user data is recorded on a data area, a test signal including a component in which the signal level is smaller than a reference value, is recorded on a test area. Then, the test signal is reproduced from the test area when a predetermined time has passed, to calculate the quality degradation of the user data from the evaluation result. Alternatively, every time when the user data is recorded/reproduced on/from the data area, the test signal is recorded/reproduced repeatedly on/from the test area. Then, the test signal is reproduced from the test area at a predetermined timing, to calculate the quality degradation of the user data from the evaluation result.

8 Claims, 6 Drawing Sheets

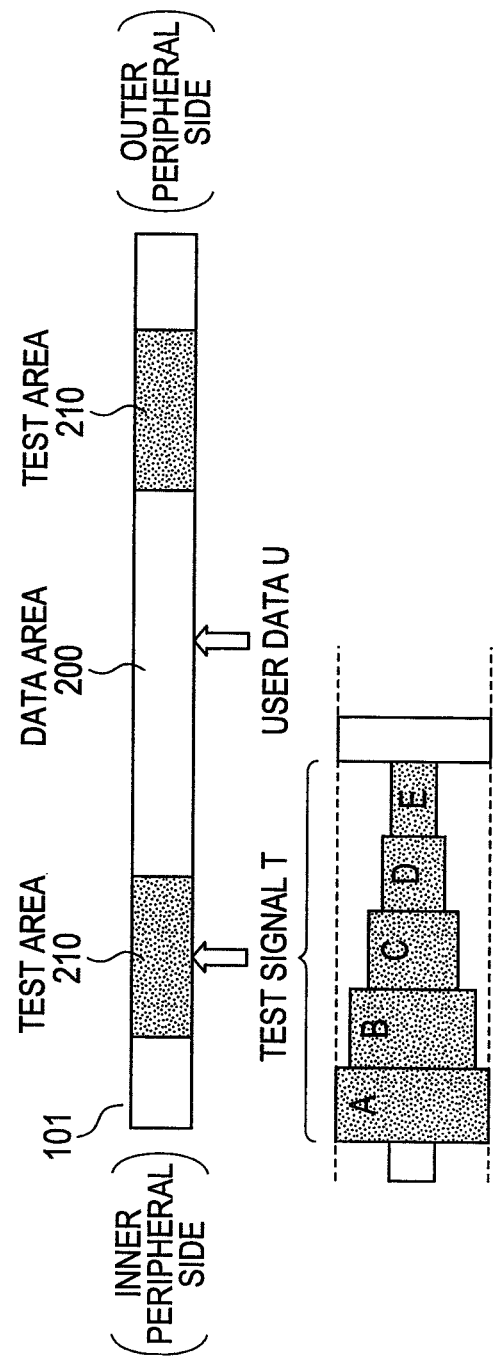

TEST SIGNAL T1

|  | A | B (REFERENCE) | C | D | E |
|---|---|---|---|---|---|
| MINIMUM BIT LENGTH | 1.1 | 1.0 | 0.9 | 0.8 | 0.7 |
| ACCELERATION FACTOR K | 1 | 1 | 1.5 | 2 | 3 |

TEST SIGNAL T2

|  | A | B | C (REFERENCE) | D | E |
|---|---|---|---|---|---|
| RECORDING POWER | 1.1 | 1.05 | 1.0 | 0.95 | 0.9 |
| ACCELERATION FACTOR K | 1 | 1 | 1 | 1.5 | 2 |

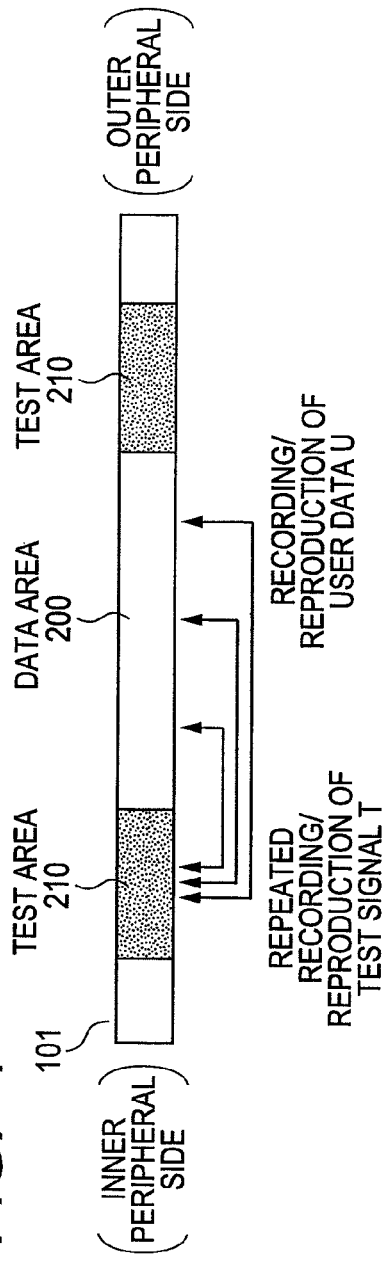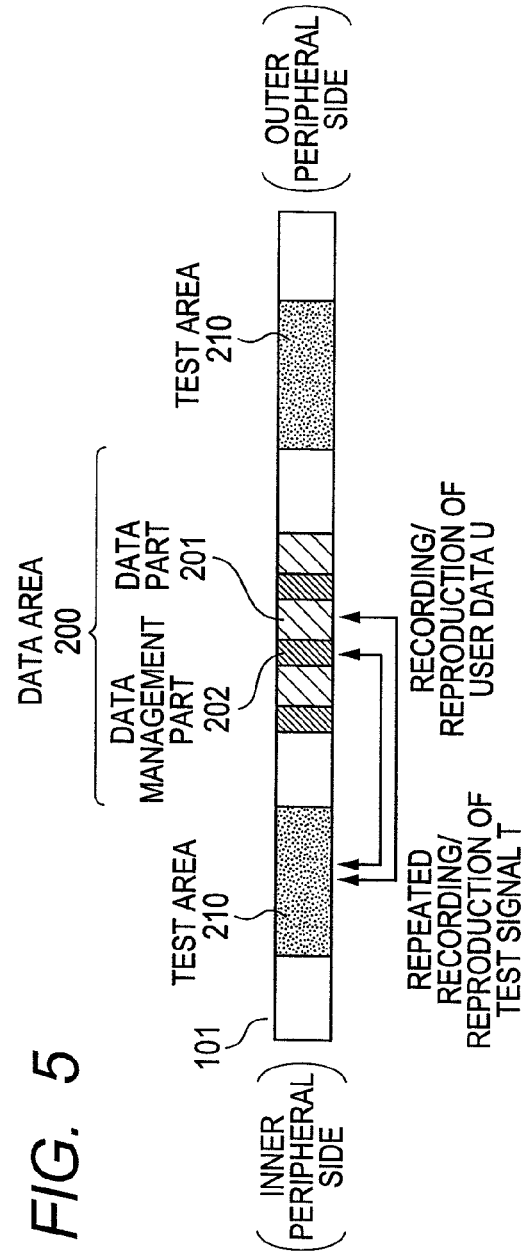

RECORDING QUALITY EVALUATION METHOD OF OPTICAL DISK AND OPTICAL DISK STORAGE SYSTEM

CLAIM OF PRIORITY

The present application claims priority from Japanese patent application serial No. JP 2010-072674, filed on Mar. 26, 2010, the content of which is hereby incorporated by reference into this application.

BACKGROUND OF THE INVENTION (1) Field of the Invention

The present invention relates to a recording quality evaluation method of an optical disk, and an optical disk storage system. More particularly, the present invention relates to a technology for evaluating the degradation of the quality of data recorded on an optical disk in a short time.

(2) Description of the Related Art

When data is recorded and stored in an optical disk for a long time, it is necessary to evaluate whether the quality of the recorded data is degraded over time. When quality degradation is detected, operations such as rewriting the data to another optical disk should be performed. The quality evaluation can determine the degree of degradation by reproducing and checking the data recorded on the optical disk. At this time, when all recorded data are checked as in the case of verify process performed at the time of recording, it takes too much time and is inefficient. Thus, there is a demand for a method of evaluating the quality in a short time.

In order to reduce the time of the verify process, the following methods have been proposed. JP-A No. 185477/2004 describes a method of performing the verify process at a predetermined time interval, and changing the time interval to perform the verify process according to the verify result. JP-A No. 181621/2009 describes a method of selecting a recording layer to perform a verification, and specifying a range to perform the verification based on the address located at the outermost periphery of the selected recording layer. JP-A No. 163881/2000 describes a method of searching the oldest information of all the information read from an optical disk, recording or reproducing the information on or from the original recording sector, and determining the quality state of the optical disk.

SUMMARY OF THE INVENTION

When data recorded on an optical disk is stored for a long time, the current degradation over time should be evaluated in a short period of time, to calculate the maximum degradation in the optical disk. When the maximum degradation exceeds an allowable value, it is necessary to take measures such as rewriting the data to another optical disk.

The method of JP-A No. 185477/2004 is a method of evaluating the quality by thinning out areas of the disk. Thus, the evaluated area does not necessarily show the maximum degradation. The method of JP-A No. 181621/2009 is a method of evaluating the quality by selecting an area around the outer periphery of the disk in which a defect is in general likely to occur. At the same time the method may overlook a significant degradation if it occurs in the other area. The method of JP-A No. 163881/2000 is based on the assumption that the older the date of the information, the greater the degradation. However, it takes a lot of time to search for the information of the oldest date. In addition, the method may not be applied to the case when the dates of the information in the disk are all the same.

In each of the methods described above, the data to be evaluated is stored in the optical disk and is used after. Thus, there is a risk that even if degradation is detected, the data would not be restored to the original state if the degree of the degradation is large. In order to restore the data, it is desirable to take measures such as estimating the period that the recorded data can be stored, and rewriting the data at the stage when the degradation is small.

The present invention aims to provide a recording quality evaluation method of an optical disk that can calculate the degradation over time of the quality of data recorded on the optical disk, and can estimate the period that the recorded data can be stored. The present invention also aims to provide an optical disk storage system.

The present invention is a recording quality evaluation method for evaluating the degradation of the quality of data recorded on an optical disk. The recording quality evaluation method includes the steps of: at the time of recording user data on the data area of an optical disk, recording a test signal including a component in which the signal level is smaller than a reference value, on a test area of the optical disk; reproducing the test signal recorded on the test area when a predetermined period of time has passed; and calculating the degradation of the quality of the user data from the evaluation result of the quality of the test signal.

Another aspect of the recording quality evaluation method according to the present invention, includes the steps of: every time when recording or reproducing user data on or from a data area of an optical disk, recording or reproducing a test signal repeatedly on or from a test area of the optical disk; reproducing the test signal recorded on the test area at a predetermined timing; and calculating the degradation of the quality of the user data from the evaluation result of the quality of the test signal.

Here, the test signal is a signal in which the signal level is gradually changed by varying the signal bit length or the recording power. The degradation of the quality of the user data is designed to be calculated based on the fact that the degradation of the quality of the test signal is accelerated according to the signal level.

Further, the present invention is an optical disk storage system for recording data on an optical disk and for evaluating the degradation of the quality of the recorded data. The optical disk storage system includes a recording/reproducing unit for recording and reproducing the data on and from the optical disk, as well as a quality evaluation unit for evaluating the quality of the reproduced data. At the time of recording user data on the optical disk, the recording/reproducing unit records a test signal including a component in which the signal level is smaller than a reference value, on a test area of the optical disk. Then, the recording/reproducing unit reproduces the test signal recorded on the test area of the optical disk when a predetermined period of time has passed. The quality evaluation unit calculates the degradation of the quality of the user data from the evaluation result of the quality of the reproduced test signal.

In another aspect of the optical disk storage system according to the present invention, the recording/reproducing unit records or reproduces a test signal repeatedly on or from the test area of the optical disk, every time when recording or reproducing user data on or from the optical disk. The recording/reproducing unit reproduces the test signal recorded on the test area of the optical disk at a predetermined timing. Then, the evaluation unit calculates the degradation of the quality of the user data from the evaluation result of the quality of the reproduced test signal.

According to the present invention, it is possible to calculate the degradation over time of the quality of data recorded on the optical disk in a short time. At the same time, it is also possible to estimate the period that the recorded data can be stored. Thus, the data recorded on the optical disk can be stably stored.

BRIEF DESCRIPTION OF THE DRAWINGS

These and other features, objects and advantages of the present invention will become more apparent from the following description when taken in conjunction with the accompanying drawings wherein:

FIG. 1 is a view showing a first embodiment (Embodiment 1) of a recording quality evaluation method of an optical disk, according to the present invention;

FIG. 4 is a view showing a second embodiment (Embodiment 2) of the recording quality evaluation method of an optical disk, according to the present invention;

FIG. 5 is a variant of the recording quality evaluation method of FIG. 4;

DETAILED DESCRIPTION OF THE EMBODIMENT

Hereinafter, preferred embodiments of the present invention will be described with reference to the accompanying drawings. Embodiment 1 is a method that is suitable for the case in which data recorded on an optical disk is stored for a long time. Embodiment 2 is a method that is suitable for the case in which data recorded on an optical disk is often recorded (overwritten) or reproduced.

Embodiment 1

FIG. 1 is a view showing a first embodiment of a recording quality evaluation method of an optical disk, according to the present invention. FIG. 1 schematically shows the recording area of an optical disk 101 used in this embodiment. The recording area includes a data area 200 for recording user data, and a specific area (hereinafter referred to as a test area 210) used for evaluating the recording quality. In the test area 210, for example, it is possible to use trial writing areas that are provided on both the inner and outer peripheral sides of the data area 200. In the conventional data recording operation, only user data U is recorded on the data area 200. However, the recording quality evaluation method according to this embodiment records a test signal T including a component in which the signal level is low, on the test area 210 at the time of recording the user data U. The test signal T is a signal in which the signal level is gradually changed as described below. The low signal level component is likely to have a reproduction error due to degradation over time. Thus, it is possible to estimate the degradation of the quality at an early stage by including the low level signal. For this reason, the user data U as well as the test signal T are recorded and stored in the optical disk 101.

With respect to the optical disk 101 on which the data is recorded, the quality of the stored data is evaluated by reproducing the data at predetermined intervals. The evaluation timing may be performed according to the user's selection, or may be performed automatically by the system.

The evaluation process reproduces the test signal T recorded on the test area 210, and determines whether an error occurs. When an error occurs, the process determines at which stage of the signal levels the error occurs, and calculates the degree of the current degradation of the user data U. In other words, it is possible to estimate the period that the data can be stored at the stage when the degradation of the user data U is small. If the calculated degradation exceeds an allowable value, the process issues a warning about that. This evaluation method is designed to reproduce and evaluate only the test signal T of the test area 210. Thus, it takes very little time and is effective, compared to the method of reproducing and evaluating the user data U of the data area 200.

Figures 2A, 2B:
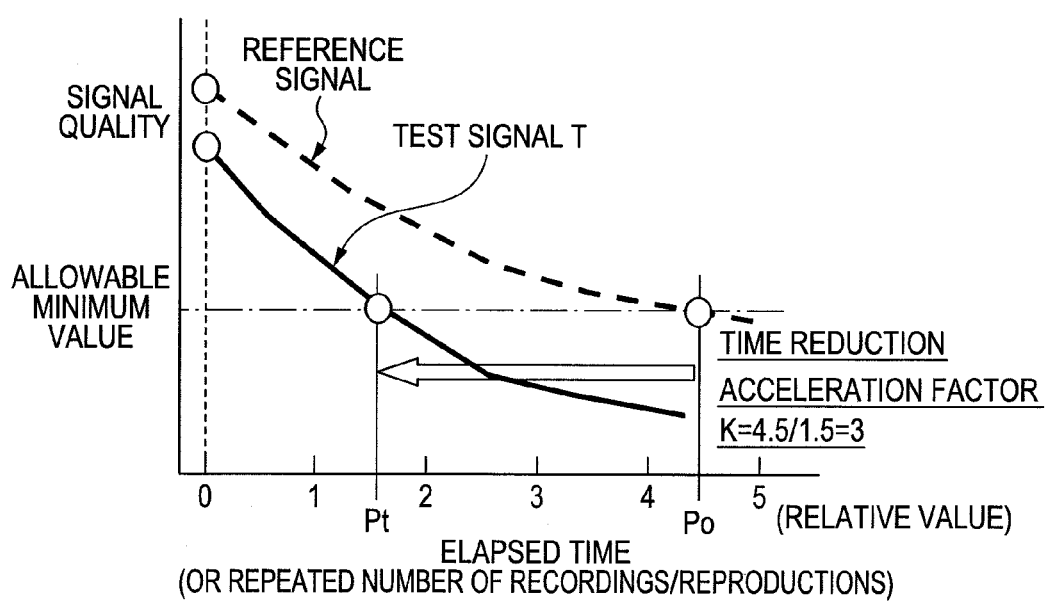
FIG. 2A is a view of examples of test signals used in the recording quality evaluation method of FIG. 1.
FIG. 2B is a schematic view showing the acceleration factor of the degradation of the test signal.

FIG. 2A is a view of an example of the test signal T used in the recording quality evaluation method shown in FIG. 1. The test signal T is a signal in which the signal level is gradually changed to A, B, and E. The signal levels are separately recorded on the test area 210. Then, each signal level is reproduced and evaluated. It is to be noted that different sign codes are used to identify the individual signal levels A, B, and E.

Test signal T1 is an example in which the minimum bit length (recording density) is changed. The smaller the bit length, the smaller the reproduced signal level, so that the signal is likely to be degraded over time. In other words, the smaller the bit length the more the degradation is accelerated. Test signal T2 is an example in which the recording power is changed. The smaller the power, the shorter the mark length is and the lower the level of the reproduced signal is. As a result, the signal is likely to be degraded over time. In this case also, the smaller the power the more the degradation is accelerated.

In this embodiment, the phenomenon of the acceleration of the degradation of the test signal is expressed by an acceleration factor K. FIG. 2B is a schematic view of the acceleration factor K of the degradation of the test signal. The figure shows how the signal quality of the test signal T, and the signal quality of the reference signal are changed over the period of time (or over the number of recordings/reproductions). Then, the period (Pt) in which the quality of the test signal T reaches the minimum allowable value, and the period (Po) in which the quality of the reference signal reaches the minimum allowable value are obtained. The period of the test signal T to reach the minimum allowable value is shortened. The acceleration factor K is calculated from the ratio (Po/Pt) of the period of the reference signal (Po) to the period of the test signal T (Pt). In this way, the acceleration factor of each component of the test signal is experimentally calculated.

For example, as shown in FIG. 2B, in the test signal T, the acceleration factor K of the component E having the bit length of 0.7 is K=Po/Pt=4.5/1.5=3. This means that the degradation of the test signal T is three times more accelerated than that of the component B (which is the reference signal).

As described above, the test signal T includes the low signal level portion. Thus, the degradation over time is more accelerated than the case of the user data U. As a result, an error occurs at an early stage in the test signal T. Then, the degree of the degradation of the user data U at this time can be calculated by determining at which stage of the signal levels A, B, and E the error occurred, and referring to the acceleration factor K of the signal at the specific signal level. In this way, it is possible to estimate the period that the user data U can be stored at the stage in which the degradation of the user data U is small.

Figure 3:
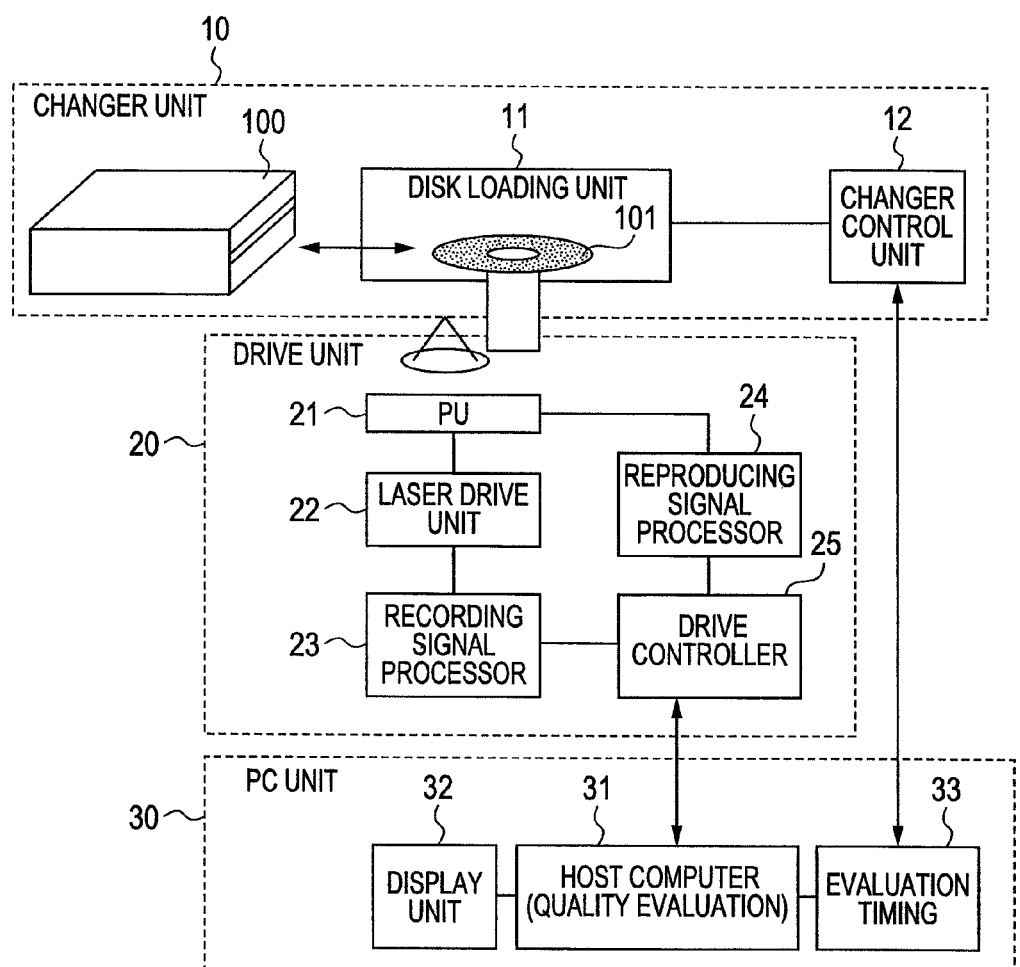
FIG. 3 is a block diagram of the first embodiment (Embodiment 1) of an optical disk storage system according to the present invention.

FIG. 3 is a block diagram of the first embodiment of an optical disk storage system according to the present invention. The optical disk storage system of this embodiment uses an optical disk medium 100 as a recording medium having a magazine structure in which a plurality of optical disks are stacked within a package. For example, Blu-ray disk (BD) capable of high-density recording is suitable for the optical disk. It goes without saying that other types of disks (DVD and the like) can also be used. Further, a plurality of disks can be used individually as a single disk. The system includes a disk changer unit 10, a disk drive unit 20, and a personal computer (PC) unit 30.

The optical medium 100 of magazine structure is placed in the disk changer unit 10. A disk loading unit 11 loads a specified optical disk 101 from the optical disk medium 100. When the disk is double-sided recording, it is necessary to perform an operation of reversing the disk. A changer controller 12 controls the disk loading unit 11, and selects the disk to be loaded.

The disk drive unit 20 records/reproduces data on or from the loaded optical disk 101. Further, the disk drive unit 20 reproduces the recorded data from the optical disk 101, and evaluates the quality of the data. A laser drive unit 22 drives an optical pickup (PU) 21 to irradiate a laser beam for recording or reproduction to the disk recording surface. A recording signal processor 23 generates a signal to be recorded on the disk. A reproducing signal processor 24 processes the signal reproduced from the disk to obtain data. Here, the recording signal processor 23 generates not only a signal for the user data U to be stored in the disk, but also a test signal T for evaluating the recording quality. Further, the reproducing signal processor 24 obtains the user data U, as well as the test data from the test signal T. A drive controller 25 controls each of the units of the disk drive unit 20, to switch between the recording operation and the reproduction operation and between the user data U and the test signal T.

The PC unit 30 is connected to the disk changer unit 10 and to the disk drive unit 20. Thus, the PC unit 30 controls the disk changer unit 10 and the disk drive unit 20. A host computer 31 communicates user data with the disk drive unit 20 to record or reproduce the user data on or from the optical disk 101. Further, the host computer 31 performs an evaluation (error check) with respect to the quality of the test signal T (test data) transmitted from the disk drive unit 20. Then, the host computer 31 calculates the degradation of the user data U from the evaluation result, and determines whether the degradation is in an allowable range. When the degradation exceeds the allowable value, the host computer 31 causes the display unit 32 to display a warning that the stored data is degraded. An evaluation timing controller 33 has a function of selecting the optical disk to evaluate the quality, determining the timing of the quality evaluation, and instructing the disk changer unit 10 to perform it.

As described above, according to this embodiment, the test signal including the component in which the signal level is low, is recorded on the test area at the time of recording the user data on the data area. By means of the test signal T it is possible to calculate the degradation over time of the quality of the user data in a short time. At the same time it is also possible to estimate the period that the user data can be stored.

The method of this embodiment is suitable for the case in which the data is recorded on the optical disk and is stored for a long time.

Embodiment 2

A second embodiment is a method used for the case in which degradation is expected to occur due to certain operations such as repeated recording and repeated reproduction. The method includes the steps of: artificially generating an area corresponding to the worst condition of the optical disk (the maximum number of rewritings or the maximum number of readings) in a specific area; evaluating the quality of the portion of this area; and estimating the quality of the recorded data.

FIG. 4 is a view illustrating the second embodiment of the recording quality evaluation method of an optical disk, according to the present invention. FIG. 4 schematically shows the recording area of the optical disk 101 used in this embodiment. The configuration is the same as the configuration of the first embodiment. In other words, the recording area includes the data area 200 for recording user data, and the specific area (test area 210) for evaluating the recording quality. The conventional data recording/reproducing operation only records or reproduces the user data U on or from the data area 200. However, according to this embodiment, every time when recording or reproducing the user data U on or from a specific location of the data area 200, the recording quality evaluation method records or reproduces the test signal T repeatedly on or from the same location of the test area 210. For example, the method records or reproduces the test signal T only once every time when receiving one recording or reproduction command to record or reproduce the user data. Alternatively, the method counts the number of recording or reproduction commands, and records or reproduces the test signal T repeatedly by the counted number of commands. The repeated recording or reproduction operation of the test signal T is performed both in the case of recording the user data U and in the case of reproducing the user data U. However, it is also possible to perform the operation only when recording or reproducing the user data U, according to the environment in which the optical disk is used.

In the test area 210, the test signal T is recorded (overwritten) or reproduced repeatedly by the number of recording or reproduction commands. As a result, the degradation over time of the signal quality of the test signal T is more accelerated than that of the user data U recorded on the data area 200. This phenomenon is schematically shown by the degradation curve in FIG. 2B. In other words, the test area 210 is the area in which the worst condition of the optical disk (the maximum number of recordings or the maximum number of reproductions) is artificially generated. The pattern of the test signal T to be repeatedly recorded is arbitrary, and the user data U may be used as it is. It is also possible to use the signal generated by gradually changing the signal level to A, B, and E as shown in FIG. 2A of the first embodiment. In this case, more quantitative evaluation of the quality degradation can be achieved. However, it is to be noted that when the recording/reproducing power is changed, the degradation speed increases as the power becomes larger.

As described above, the optical disk 101 on which the test signal T is recorded together with the user data U, is reproduced at a predetermined timing to evaluate the quality of the data stored in the optical disk. The evaluation timing is effective at the time of recording or reproducing the test signal T repeatedly on or from the optical disk. However, the evaluation may be performed at the time when the number of repeated recordings or repeated reproductions reaches a predetermined value, or in combination with a predetermined elapsed time.

The evaluation process reproduces the test signal T recorded on the test area 210, and determines whether an error occurs. When an error occurs, the evaluation process calculates the current degradation of the user data U by taking into account the cumulative number of repeated recordings/reproductions at this time. Thus, as described above with reference to FIG. 2B, the evaluation process experimentally obtains the degradation speed (acceleration factor) for each of the number of repeated recordings and the number of repeated reproductions in advance. Then, the evaluation process calculates the degradation of the user data U by using the acceleration factor. Further, the evaluation process estimates the period that the user data U can be stored from the current elapsed time. If the calculated degradation exceeds the allowable value, the evaluation process issues a warning about that.

In this evaluation method, only the test signal T of the test area 210 is reproduced and evaluated. Thus, the evaluation can be effectively performed in a very short time, compared to the method of reproducing and evaluating the user data U of the data area 200.

FIG. 5 is a variant of the recording quality evaluation method shown in FIG. 4. The data area 200 of the optical disk 101 includes a data part 201 for storing the user data U, and a data management part 202 for managing the user data U. Then, when receiving a recording or reproduction command to record or reproduce the user data, the evaluation process records or reproduces the user data on or from the data part 201. At this time, the evaluation process also records or reproduces the management information on or from the data management part 202 for managing the user data. However, even if the recording/reproduction command is received once, the number of accesses to the data part 201 or the number of accesses to the data management unit 202 is not necessarily one. In addition, the number of accesses to the data part 201, and the number of accesses to the data management unit 202 are different depending on the situation of each case.

Thus, in this embodiment, the number of accesses to the data part 201 and the number of accesses to the data management part 202 are counted separately. Then, the test signal T is recorded or reproduced repeatedly by the sum of the access numbers. The quality evaluation method of the test signal T is the same as shown in FIG. 4. By means of this method it is possible to obtain the evaluation result reflecting the actual number of recordings/reproductions (or the physical number of recordings/reproductions) by counting the numbers of accesses in the data area 200. As a result, the evaluation accuracy is further increased.

Figure 6:
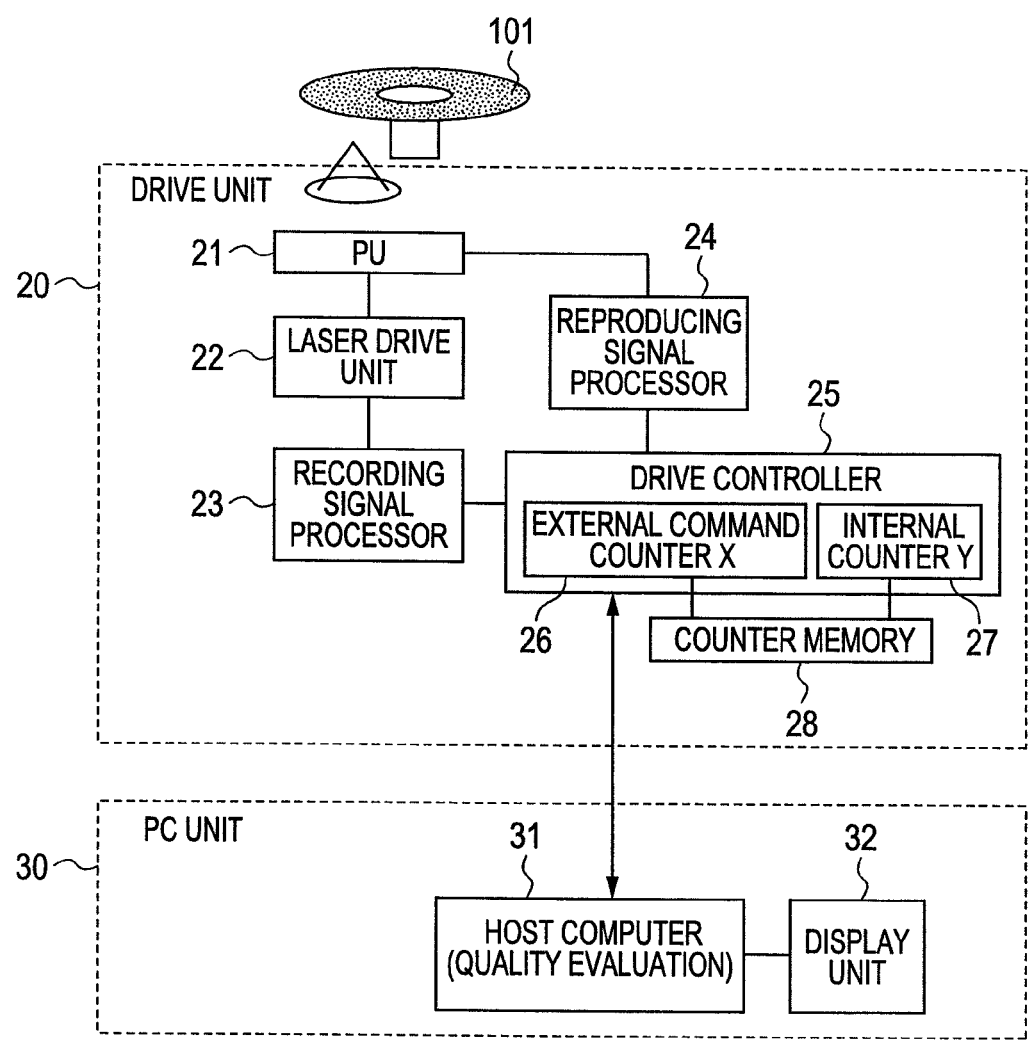
FIG. 6 is a block diagram of the second embodiment (Embodiment 2) of the optical disk storage system according to the present invention.

FIG. 6 is a block diagram of the second embodiment of the optical disk storage system according to the present invention. FIG. 6 shows the configuration corresponding to the recording quality evaluation method shown in FIG. 4. It is based on the configuration of the optical disk storage system shown in FIG. 3 of the first embodiment, in which the same or similar components are designated by the same reference numerals and the description thereof will be omitted.

In this embodiment, an external command counter 26, an internal counter 27, and a counter memory 28 are added to the disk drive unit 20. It is to be noted that the disk changer unit 10 shown in FIG. 3 is omitted in this embodiment. However, it goes without saying that the disk changer unit 10 can also be provided to support the optical disk medium 100 of the magazine structure.

The drive controller 25 of the disk drive unit 20 controls recording and reproduction of the data on or from the optical disk 101. At this time, the external command counter 26 counts the number of recording or reproduction commands (external commands) transmitted from the host computer 31. The internal counter 27 counts the number of recording or reproduction instructions (internal commands) that the drive controller 25 issues automatically. The internal command is an instruction, such as rerecording or rereading, to be performed when the data recording or data reproduction failed. In both of the commands, the user data U is recorded/reproduced on or from the data area 200 of the disk. The counter memory 28 stores the recording/reproduction counter value X of the external command counter 26, the recording/reproduction counter value Y of the internal counter 27, and the sum of the counter values (X+Y). Further, the counter memory 28 stores the cumulative number of repeated recordings/reproductions of the test signal T for each optical disk 101.

The drive controller 25 reads the recording/reproduction counter values X, Y stored in the counter memory 28, for example, at the time of the completion of a series of data recording/reproduction operations to be processed. Then, the drive controller 25 records or reproduces the test signal T repeatedly by the sum of the counter values (X+Y) in the test area 210 of the optical disk. The recording signal processor 23 generates the test signal T. At this time, the user data U may be used as it is, or another signal may be generated by gradually changing the signal level as shown in FIG. 2A.

Further, the drive controller 25 reproduces the test signal T recorded on the test area 210 of the optical disk at a predetermined timing. The host computer 31 performs an evaluation (error check) with respect to the quality of the obtained test data. Then, the host computer 31 calculates the degradation of the user data U. If the calculated degradation exceeds the allowable value, the host computer 31 causes the display unit 32 to display a warning that the stored data is degraded.

The optical disk storage system described in FIG. 6 corresponds to the method of FIG. 4, which is the method of repeatedly recording/reproducing by the number of commands. However, also in the method of FIG. 5, which is the method of repeatedly recording/reproducing by the number of accesses to the data part 201 and the number of accesses to the data management part 202, the same operation can be performed by changing the counters 26, 27 to the access counter of the data unit 201 and to the access counter of the data management unit 202, respectively.

Figure 7:
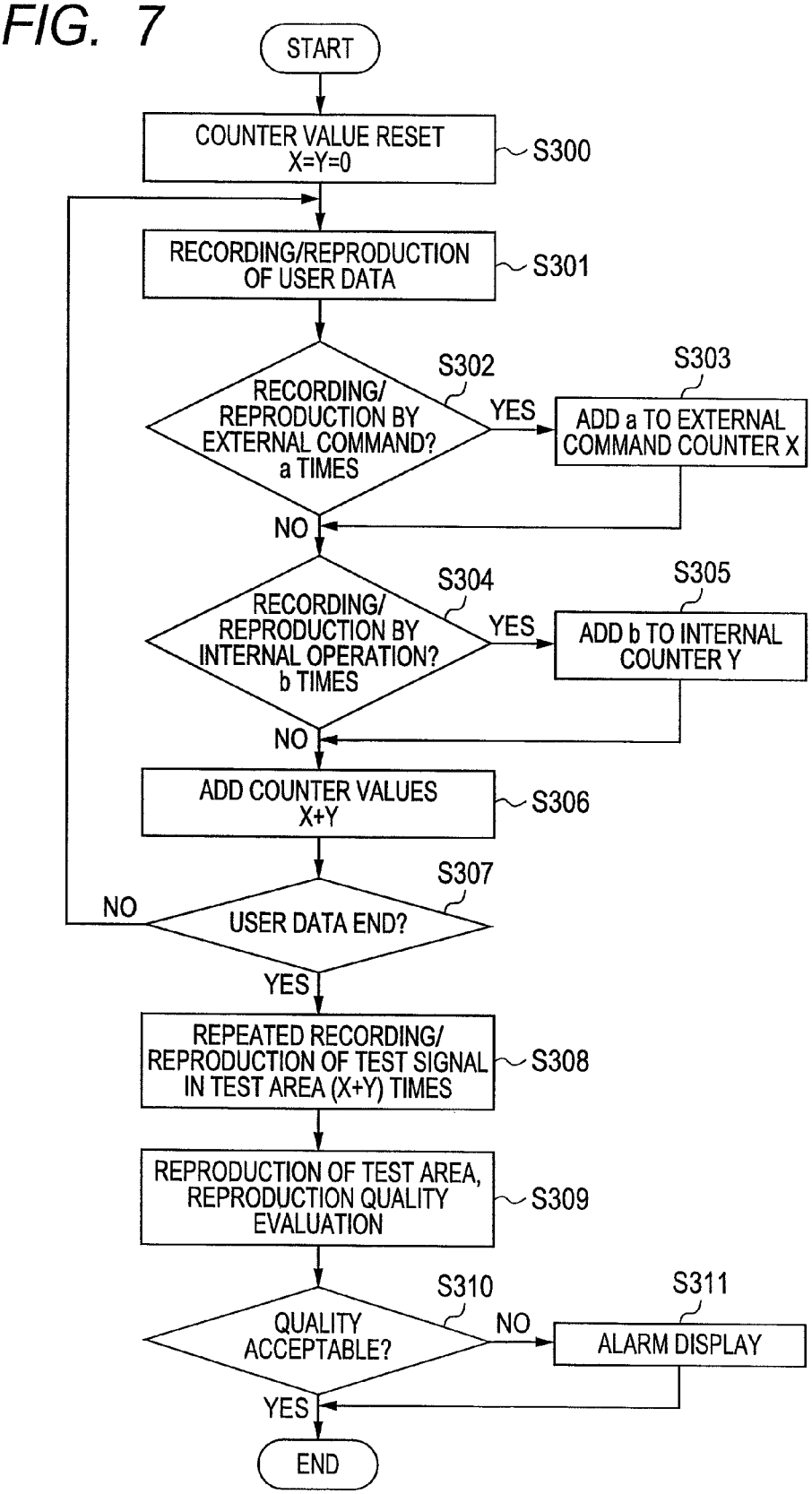
FIG. 7 is a flowchart showing the process of the recording quality evaluation method of FIG. 4.

FIG. 7 is a flowchart showing the process of the recording quality evaluation method of this embodiment. FIG. 7 shows, as described in FIG. 4, the case of recording/reproducing the test signal T repeatedly by the number of commands.

In S300, the process resets the counter value X of the external command counter 26, as well as the counter value Y of the internal counter 27 to zero. In S301, the process records or reproduces the user data U on or from the data area 200 of the optical disk 101.

In S302, the process determines whether the recording/reproducing operation in S301 is the recording/reproduction by an external command. If YES, the process proceeds to S303, and adds the command number a to the counter value X of the external command counter 26.

In S304, the process determines whether the recording/reproducing operation in S301 is the recording/reproduction by the internal operation of the drive controller 25. If YES, the process proceeds to S305, and adds the command number b to the counter value Y of the internal counter 27.

In S306, the process adds the counter value X of the external command counter 26, and the counter value Y of the internal counter 27. Then, the process stores the sum of the counter values (X+Y) to the counter memory 28. In S307, the process determines whether all the user data recording or reproducing operations are completed. If all the operations have been completed, the process proceeds to S308. If not completed, the process returns to S301 to record/reproduce the remaining data.

In S308, the process reads the sum of the command numbers (X+Y) from the counter memory 28. Then, the process records/reproduces the test signal T repeatedly by the value of (X+Y) on or from the test area 210 of the optical disk 101. Further, the process records the cumulative number Z of times of repeatedly recording/reproducing the test signal T, to the counter memory 28.

In S309, the process reproduces the test signal T from the test area 210 and determines whether an error occurs to calculate the degradation of the user data U. At this time, the process calculates the degradation by referring to the cumulative number Z of times of recording/reproducing the test signal T on or from the specific optical disk 101.

In S310, the process determines whether the quality of the user data U is in the allowable range. If the degradation exceeds the allowable value, the process proceeds to S311, causing the display unit 32 to display a warning message such as saying "The stored data is degraded. Rewrite to another disk". As described above, a series of recording/reproducing operations are completed. Then, the process waits for the next instruction.

The process described in the flowchart of FIG. 7 corresponds to the method shown in FIG. 4, which is the method of repeatedly recording/reproducing by the number of commands. However, also in the method of FIG. 5, which is the method of repeatedly recording/reproducing by the number of accesses to the data part 201 and the number of accesses to the data management part 202, the same operation can be performed by changing the number of commands to the number of accesses.

As described above, according to the present embodiment, when the user data is recorded on the data area, the test signal for evaluating the recording quality is recorded or reproduced repeatedly on or from the test area. By means of the test signal T it is possible to calculate the degradation over time of the quality of the user data in a short time. At the same time it is also possible to estimate the period that the user data can be stored. The method of this embodiment is suitable for the case in which data is recorded on the optical disk, and is often recorded (overwritten) or reproduced repeatedly on or from the optical disk.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A recording quality evaluation method of an optical disk that evaluates the degradation of quality of data recorded on the optical disk, the recording quality evaluation method comprising the steps of:
    recording user data on a data area of an optical disk;
    recording a test signal on a test area of the optical disk, wherein a rate of degradation of quality of the test signal recorded on the test area of the optical disk is greater than a rate of degradation of the user data recorded on the data area of the optical disk;
    reproducing the test signal recorded on the test area of the optical disk;
    evaluating degradation of quality of the reproduced test signal after a predetermined period of time has passed; and
    calculating degradation of quality of the user data, from the evaluation result of the degradation of quality of the reproduced test signal.

2. A recording quality evaluation method of an optical disk that evaluates the degradation of quality of data recorded on the optical disk, the recording quality evaluation method comprising the steps of:
    recording user data on a data area of an optical disk;
    recording a test signal on a test area of the optical disk;
    reproducing user data from a data area of the optical disk;
    reproducing repeatedly the test signal recorded on the same location of the test area of the optical disk;
    evaluating degradation of quality of the reproduced test signal at a predetermined timing; and
    calculating degradation of quality of the user data, from the evaluation result of degradation of quality of the reproduced test signal.

3. The recording quality evaluation method of an optical disk according to claim 1,
    wherein a warning about degradation of quality of the user data is issued based on the evaluation result of the degradation of quality of the test signal.

4. An optical disk storage system for recording data on an optical disk and evaluating degradation of quality of the recorded data, the optical disk storage system comprising:
    a recording/reproducing unit configured to record and reproduce data on and from the optical disk; and
    a quality evaluation unit configured to evaluate quality of the reproduced data;
    wherein the recording/reproducing unit records user data on a data area of the optical disk and records a test signal on a test area of the optical disk;
    wherein a rate of degradation of quality of the test signal recorded on the test area of the optical disk is greater than a rate of degradation of the user data recorded on the data area of the optical disk;
    wherein the recording/reproducing unit reproduces the test signal recorded on the test area, after a predetermined period of time has passed;
    wherein the quality evaluation unit evaluates degradation of quality of the reproduced test signal, and calculates degradation of quality of the user data, from the evaluation result of degradation of quality of the reproduced test signal.

5. An optical disk storage system for recording data on an optical disk and evaluating degradation of quality of the recorded data, the optical disk storage system comprising:
    a recording/reproducing unit configured to record and reproduce data on and from the optical disk; and
    a quality evaluation unit configured to evaluate quality of the reproduced data;
    wherein the recording/reproducing unit records user data on a data area of the optical disk, records a test signal on a test area of the optical disk, reproduces user data from a data area of the optical disk and reproduces a test signal repeatedly recorded on the same location of the test area of the optical disk;
    wherein the recording/reproducing unit reproduces the test signal recorded on the test area, at a predetermined timing; and
    wherein the quality evaluation unit evaluates degradation of quality of the reproduced test signal and calculates degradation of quality of the user data, from the evaluation result of degradation of quality of the reproduced test signal.

6. The optical disk storage system according to claim 5, further comprising:
   a counter configured to count the number of reproduction commands to reproduce the user data from the optical disk;
   wherein the recording/reproducing unit reproduces the test signal repeatedly, based on the value of the counter.

7. The recording quality evaluation method of an optical disk according to claim 1,
   wherein the test signal is recorded repeatedly on the test area of the optical disk, by overwriting.

8. The optical disk storage system according to claim 4,
   wherein the recording/reproducing unit records the test signal repeatedly on the test area of the optical disk, by overwriting.

* * * * *